United States Patent
Vaid et al.

(10) Patent No.: US 8,984,265 B2
(45) Date of Patent: Mar. 17, 2015

(54) SERVER ACTIVE MANAGEMENT TECHNOLOGY (AMT) ASSISTED SECURE BOOT

(75) Inventors: Kushagra Vaid, San Jose, CA (US); Vincent J. Zimmer, Federal Way, WA (US); Mrigank Shekhar, Camas, WA (US)

(73) Assignee: Intel Corporation, Santa Clara, CA (US)

( * ) Notice: Subject to any disclaimer, the term of this patent is extended or adjusted under 35 U.S.C. 154(b) by 1652 days.

(21) Appl. No.: 11/731,526

(22) Filed: Mar. 30, 2007

(65) Prior Publication Data

US 2008/0244257 A1   Oct. 2, 2008

(51) Int. Cl.
*G06F 9/00* (2006.01)
*G06F 15/177* (2006.01)
*G06F 21/57* (2013.01)
*H04L 9/08* (2006.01)

(52) U.S. Cl.
CPC ............ *G06F 21/575* (2013.01); *H04L 9/0827* (2013.01)
USPC ............................................... 713/2; 380/277

(58) Field of Classification Search
None
See application file for complete search history.

(56) References Cited

U.S. PATENT DOCUMENTS

| | | | |
|---|---|---|---|
| 5,237,611 A * | 8/1993 | Rasmussen et al. | 380/284 |
| 6,711,684 B1 * | 3/2004 | Moroney et al. | 713/191 |
| 8,154,987 B2 * | 4/2012 | Yavatkar et al. | 370/216 |
| 2004/0177243 A1 * | 9/2004 | Worley, Jr. | 713/2 |
| 2005/0005108 A1 * | 1/2005 | Harper | 713/165 |
| 2005/0138409 A1 * | 6/2005 | Sheriff et al. | 713/200 |
| 2005/0149924 A1 * | 7/2005 | Komarla et al. | 717/176 |
| 2006/0053276 A1 * | 3/2006 | Lortz et al. | 713/2 |
| 2006/0179308 A1 * | 8/2006 | Morgan et al. | 713/168 |
| 2007/0033419 A1 * | 2/2007 | Kocher et al. | 713/193 |
| 2008/0148041 A1 * | 6/2008 | Carlson et al. | 713/151 |
| 2008/0215874 A1 * | 9/2008 | Dale et al. | 713/2 |

* cited by examiner

*Primary Examiner* — Nadia Khoshnoodi
(74) *Attorney, Agent, or Firm* — Trop, Pruner & Hu, P.C.

(57) ABSTRACT

In some embodiments, the invention involves a system and method relating to secure booting of a platform. In at least one embodiment, the present invention is intended to securely boot a platform using one or more signature keys stored in a secure location on the platform, where access to the signature is by a microcontroller on the platform and the host processor has no direct access to alter the signature key. Other embodiments are described and claimed.

12 Claims, 5 Drawing Sheets

SERVER ACTIVE MANAGEMENT TECHNOLOGY (AMT) ASSISTED SECURE BOOT

FIELD OF THE INVENTION

An embodiment of the present invention relates generally to booting of a platform and, more specifically, to a secure boot using a signature key stored in a secure location on the platform.

BACKGROUND INFORMATION

Various mechanisms exist for secure booting. The Unified Extensible Firmware Interface (UEFI) specification defines a new model for the interface between operating systems and platform firmware. The interface consists of data tables that contain platform-related information, plus boot and runtime service calls that are available to the operating system and its loader. Together, these provide a standard environment for booting an operating system and running pre-boot applications. More information about UEFI may be found on the public Internet at URL www*uefi*org/home. Please note that periods have been replaced with asterisks in this document to prevent inadvertent hyperlinks. The UEFI standard may be used to assist with secure boot up of a platform.

Chapter 26 of the UEFI Specification 2.1 describes a protocol for secure boot. The defined protocol provides access for generic authentication information with specific device paths. The protocol may be used on any device handle to obtain information associated with the physical or logical device. Public keys and certificates may be kept on the firmware and check digital signatures on third part EFI drivers and Operating System (OS) loaders. Binding public keys to the platform has been a deployment problem. The security is only as good as the platform can securely store the public keys. Revocation at boot time of a public key or certificate is not possible. Counterfeit loaders may be inserted in to the platform to circumvent the security. Thus, this method of secure booting may still be vulnerable to attacks during boot time.

BRIEF DESCRIPTION OF THE DRAWINGS

The features and advantages of the present invention will become apparent from the following detailed description of the present invention in which.

DETAILED DESCRIPTION

An embodiment of the present invention is a system and method relating to secure booting of a platform. In at least one embodiment, the present invention is intended to securely boot a platform using a signature key stored in a secure location on the platform, where access to the signature is by a microcontroller, or other secondary processor on the platform, and the host processor has no direct access to alter the signature key.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

For purposes of explanation, specific configurations and details are set forth in order to provide a thorough understanding of the present invention. However, it will be apparent to one of ordinary skill in the art that embodiments of the present invention may be practiced without the specific details presented herein. Furthermore, well-known features may be omitted or simplified in order not to obscure the present invention. Various examples may be given throughout this description. These are merely descriptions of specific embodiments of the invention. The scope of the invention is not limited to the examples given.

An embodiment of the invention enhances the standard secure boot protocol of the UEFI standard by utilizing a microcontroller separate from the host processor on the platform. The microcontroller may have active management technology (AMT) capabilities, such as Intel® Active Management Technology (iAMT) capabilities, as well as having out-of-band (OOB) communication capabilities, hereinafter referred to as an out-of-band (OOB) microcontroller, or also interchangeably referred to as a manageability engine (ME) controller or iAMT. Intel® Active Management Technology (iAMT) is described at URL www*intel*com/technology/manage/iamt/. By utilizing the OOB capabilities of the microcontroller, certificates and keys may be compared with authenticated web sites or bulletin boards accessible via an OOB connection, typically on the public Internet. During boot, the certificates and keys may be validated by the OOB microcontroller.

Figure 1:
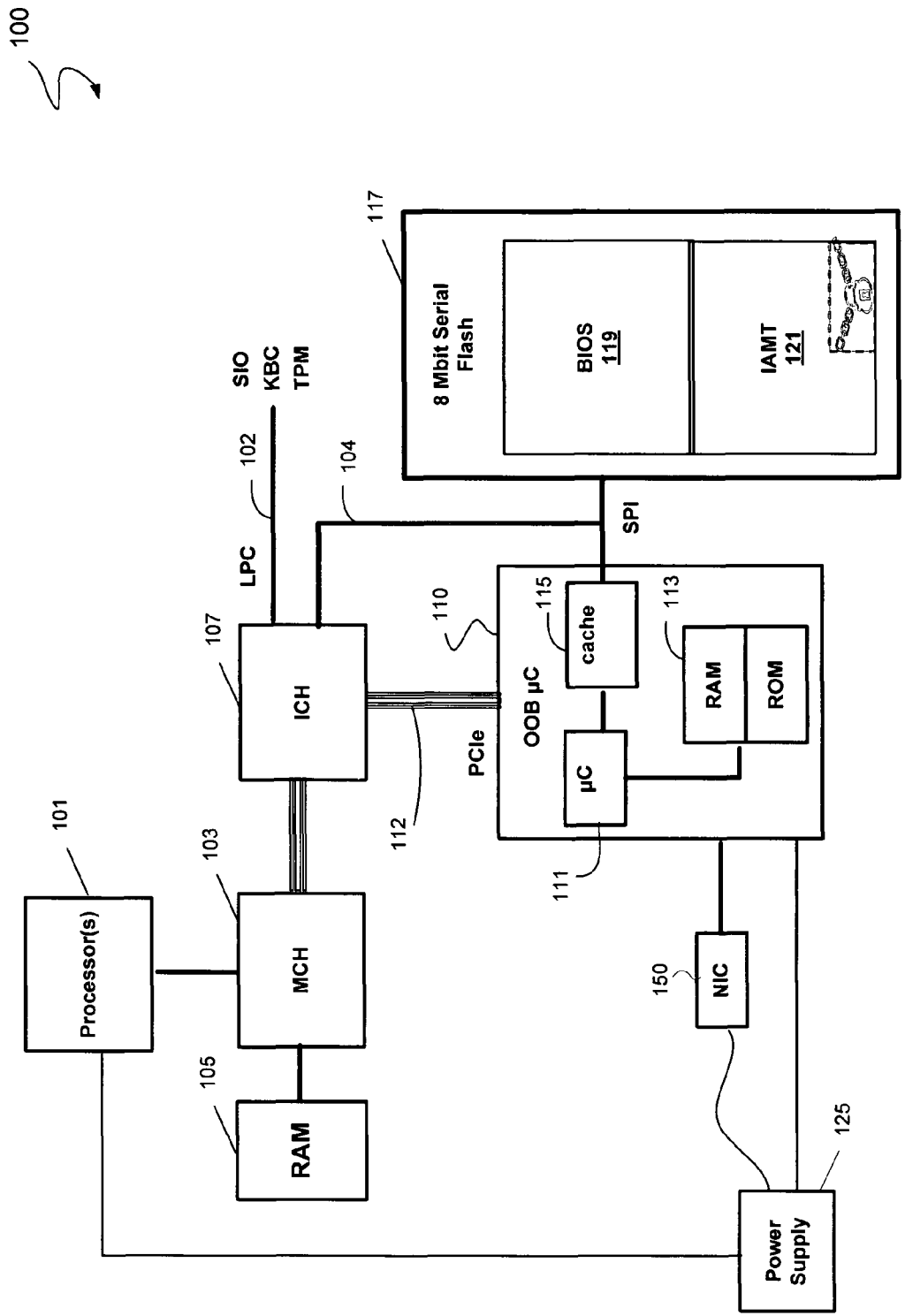
FIG. 1 is a block diagram illustrating features of an out-of-band microcontroller (OOB microcontroller), according to an embodiment of the environment.

FIG. 1 is a block diagram illustrating features of an exemplary out-of-band microcontroller (OOB microcontroller), according to an embodiment of the environment. Embodiments of this system topology have an added network connection, such as a network interface card (NIC) 150. NIC 150 may be used for OOB platform manageability and communication. In an embodiment, the OOB microcontroller support may enable managing of the system without perturbing the performance of the system.

A platform 100 comprises a processor 101. The processor 101 may be connected to random access memory 105 via a memory controller hub 103. Processor 101 may be any type of processor capable of executing software, such as a microprocessor, digital signal processor, microcontroller, or the like. Though FIG. 1 shows only one such processor 101, there may be one or more processors in the platform 100 and one or more of the processors may include multiple threads, multiple cores, or the like.

The processor 101 may be further connected to I/O devices via an input/output controller hub (ICH) 107. The ICH may be coupled to various devices, such as a super I/O controller (SIO), keyboard controller (KBC), or trusted platform module (TPM) via a low pin count (LPC) bus 102. The SIO, for instance, may have access to floppy drives or industry standard architecture (ISA) devices (not shown). In an embodiment, the ICH 107 is coupled to non-volatile memory 117 via a serial peripheral interface (SPI) bus 104. The non-volatile memory 117 may be flash memory or static random access memory (SRAM), or the like. An out-of-band (OOB) microcontroller 110 may be present on the platform 100. The OOB microcontroller 110 may connect to the ICH 107 via a bus 112, typically a peripheral component interconnect (PCI) or PCI express (PCIe) bus. The OOB microcontroller 110 may also be coupled with the non-volatile memory store (NV store) 117 via the SPI bus 104. The NV store 117 may be flash memory or static RAM (SRAM), or the like. In many existing systems, the NV store is flash memory.

The OOB microcontroller 110 may be likened to a "miniature" processor. Like a full capability processor, the OOB microcontroller has a processor unit 111 which may be operatively coupled to a cache memory 115, as well as RAM and ROM memory 113. The OOB microcontroller may have a built-in network interface 150 and independent connection to a power supply 125 to enable out-of-band communication even when the in-band processor 101 is not active, or fully booted.

In embodiments, the processor has a basic input output system (BIOS) 119 in the NV store 117. In other embodiments, the processor boots from a remote device (not shown) and the boot vector (pointer) resides in the BIOS portion 119 of the NV store 117. The OOB microcontroller 110 may have access to all of the contents of the NV store 117, including the BIOS portion 119 and a protected portion 121 of the non-volatile memory. In some embodiments, the protected portion 121 of memory may be secured with Intel® Active Management Technology (iAMT).

The OOB microcontroller may be coupled to the platform to enable SMBUS commands. The OOB microcontroller may also be active on the PCIe bus. An integrated device electronics (IDE) bus may connect to the PCIe bus. In an embodiment, the SPI 104 is a serial interface used for the ICH 107 to communicate with the flash 117. The OOB microcontroller may also communicate to the flash via the SPI bus. In some embodiments, the OOB microcontroller may not have access to one of the SPI bus or other bus.

The portion of NV memory 121 that is available only to the OOB microcontroller may be used to securely store certificates, keys and signatures that are inaccessible by the BIOS, firmware or operating system. The NIC 150 may be used to access the Internet, bulletin board or other remote system to validate keys and certificates stored in the NV memory 121. Without the use of the out-of-band communication, revocation and validation are not possible using the system firmware at boot time because no network connectivity exists until the host processor's drivers have been initialized. The OOB microcontroller can access the remote system early during boot of the host processor 101 on the platform to validate drivers and loaders to be used to fully boot the platform. The remote system may identify a specific certificate as being out of date or revoked. Without the ability to revoke the certificate prior to boot, the platform is vulnerable to counterfeit loaders, etc. The OOB microcontroller may identify revoked certificates from the remote system, for instance on a certificate revocation list (CRL), and mark them accordingly in the NV storage 121. Thus, upon boot a revoked certificate will not authenticate a counterfeit or out of date module, in error.

In some embodiments, the OOB microcontroller is a manageability engine (ME) controller. The ME controller, also known simply as the manageability engine (ME), may be integrated into the platform. In some embodiments, the ME may perform other manageability functions, also known as iAMT capabilities. However, this functionality is not required to practice embodiments of the invention, as described herein. For purposes of this discussion, the terms ME and iAMT controller refer to the physical controller and not to the capabilities of the platform. The ME can typically access the chipset registers through internal data paths or system bus (SMBUS) or PECI accessors. For purposes of illustration, FIGS. 2A-B are shown with ME controllers and iAMT code.

Figure 2:
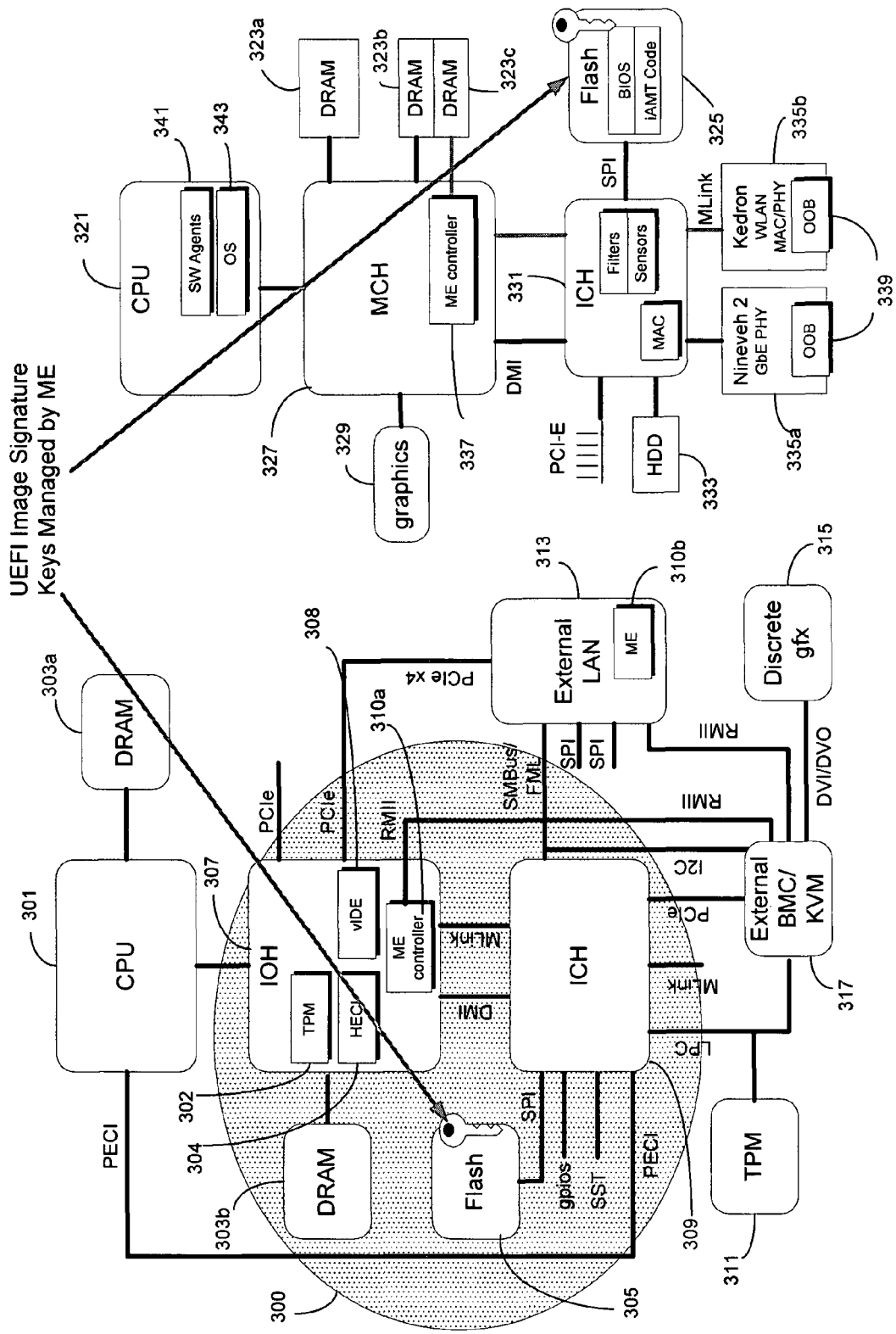
FIG. 2A is a block diagram illustrating an exemplary server platform, according to embodiments of the invention.
FIG. 2B is a block diagram illustrating an exemplary client platform, according to embodiments of the invention.

Referring now to FIG. 2A, there is shown a block diagram illustrating an exemplary server platform, according to embodiments of the invention. In one server embodiment, a platform comprises processor 301 communicatively coupled to DRAM 303a-b, an input/output Hub (IOH) 307, flash memory 305, and an input/output controller hub (ICH) 309. In this server embodiment, the north bridge (memory controller not shown) resides in the processor 301. The platform may have a trusted platform module (TPM) 311 and may be connected to an external LAN 313. The platform may also be coupled with a discrete graphics controller 315 via an external baseboard management controller (BMC) or keyboard-video-mouse (KVM) interface 317. KVM is a chip that allows multiplexing many possible local/remote keyboards/mice/video sources. In this exemplary embodiment, the IOH 307 may have additional components for TPM 302, host embedded controller interface (HECI) 304, virtual IDE (vIDE) 308, and ME controller 310a. The HECI 304 is similar to a PCI device and is the means by which the BIOS and OS may communicate with the ME 310a. The vIDE 308 enables virtual indirection to a LAN 313. The shaded area 300 indicates portions of the platform that are used by the ME controller 310a. For instance, in an embodiment, the ME controller 310a has a limited amount of ROM to store its code. In this case, the ME controller 310a accesses a partitioned, or protected, portion of the flash 305 having ME or iAMT code. Resources in the ICH 309 may be required for the ME controller 310a to perform other iAMT functions. The external LAN 313 may also have a separate ME controller component 310b. However, the embedded ME controller 310a has access to protected memory in the flash and may result in a system less vulnerable to attack.

The ME controller 310a or 310b may program other chips on the platform via a number of buses and communication paths within the platform. The link between the processor 301 and the IOH 307 may comprise a point to point (pTp) interconnection link, or other communication interface. The memory controller hub (MCH), or north bridge, is typically built into the processor 301 for servers, and is not shown.

In an alternative embodiment, the external BMC 317 may be used to access a remote system to authenticate keys and certificates during boot. However, a BMC 317 does not have secured access to a portion of flash memory 305 and may result in a less secure system. A preferred embodiment is to utilize the ME 310a to ensure that the certificates and keys are stored in a hardware protected area of the flash 305.

The iAMT code resides in a protected portion of flash memory 305. This portion is inaccessible to the OS and firmware (BIOS/EFI). In some embodiments, there may be a base address register (BAR) in the ICH 309. Upon boot, the BIOS sets the register in the ICH 309 to define which portions of the flash are accessible to the BIOS and which portion is accessible only to the ME 310. If the ICH BAR register indicates that a portion of the flash is inaccessible to the BIOS, the memory will be unmappable and completely invisible and inaccessible to the firmware and OS. Other methods of sequestering portions of the memory via a hardware protection scheme may be devised and used by those of skill in the art.

FIG. 2B illustrates an exemplary client platform, according to embodiments of the invention. In an exemplary client embodiment, the platform comprises a processor 321 having software agents 341 and an operating system 343. The processor 321 is communicatively coupled to DRAM 323a-c via a memory controller hub (MCH), or north bridge 327. The MCH 327 may communicate to a graphics interface 329 and an input/output controller hub (ICH) 331. The ICH 331 may communicate with a hard disk drive (HDD) 333, flash memory 325 and one or more network interface devices 335a-b, for instance the Ninevah 2 Ethernet controller or the Kedron wireless LAN adapter, both available from Intel Corp. The network devices 335a-b may have an out-of-band (OOB) communications component 339. In this embodiment, the ME subsystem 337 may be built into the MCH 327. The flash memory 325 comprises the firmware code (BIOS), protected iAMT code and manufacturer settings. It will be apparent to one of skill in the art that processors 301 and 321 may comprise single or multi-processors and/or may have more than one core. It will also be apparent that various components of the platforms shown in 2A and 2B may be combined or made separate without affecting the viability of embodiments of the invention as disclosed herein.

The embodiment shown in FIG. 2B operates in a similar manner as that shown in FIG. 2A. Both embodiments utilize a manageability engine (ME) 310, 337 to store and validate keys and certificates in a protected memory, for instance flash 305, 325. Secure boot processes execute the boot script on the ME controller 310, 337, or send the appropriate commands and data to the processor 301, 321 for processing by system firmware. In either case, the boot keys and certificates are protected from tampering.

Figure 3:
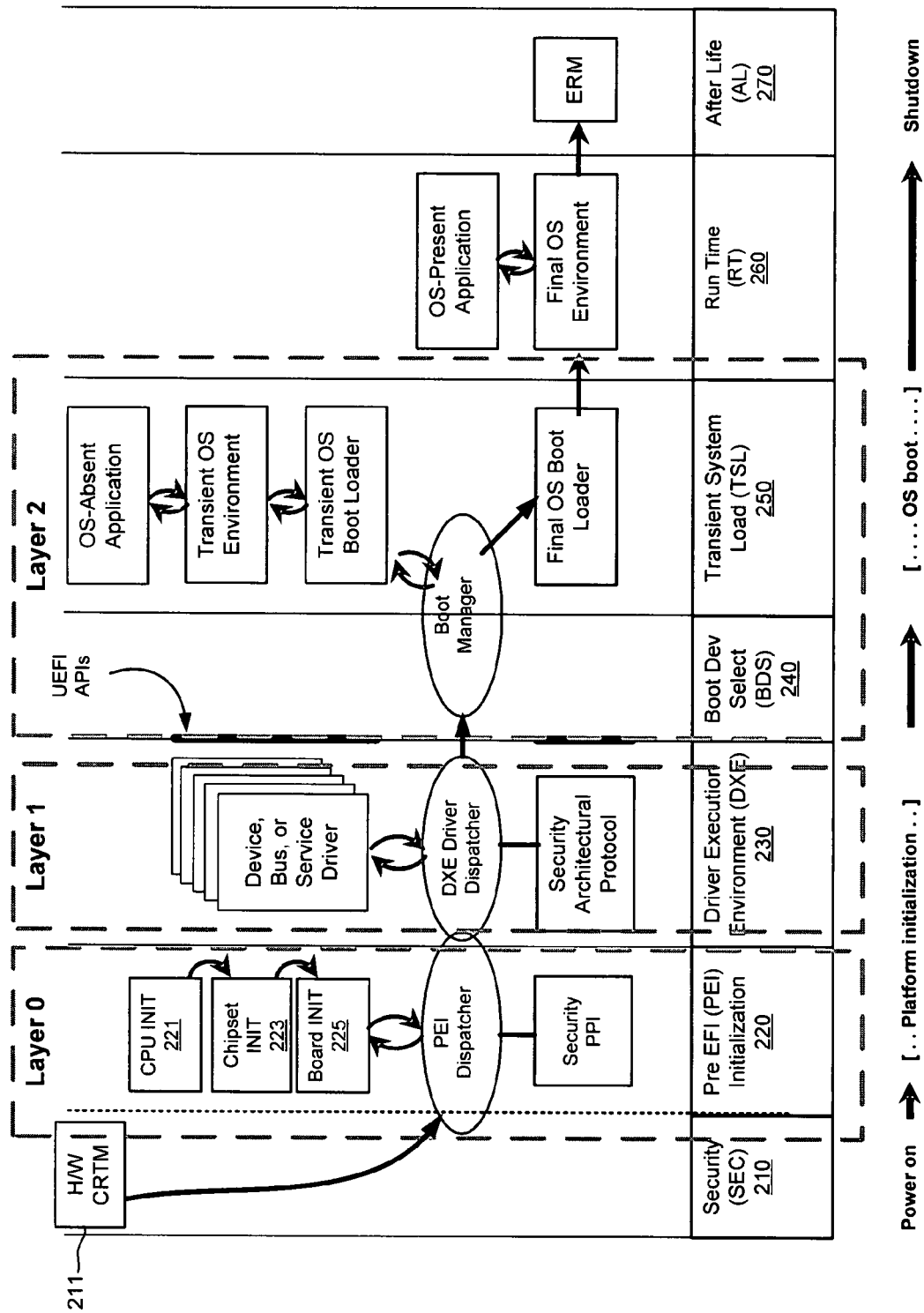
FIG. 3 illustrates the flow of execution of an extensible firmware interface (EFI) architecture system according to an embodiment of the invention.

Embodiments of the present invention may be implemented on a platform conforming to a unified extensible firmware interface (UEFI). Boot processes on a UEFI/EFI platform are illustrated in FIG. 3. FIG. 3 illustrates the flow of execution of a system according to an embodiment of the invention. A pre-verifier, or hardware core root of trust module (CRTM), 211 may be run at power-on at the security (SEC) phase 210. A pre-verifier is typically a module that initializes and checks the environment. In existing systems, the pre-verifier and SEC phase is the Core Root of Trust for Measurement (CRTM), namely enough code to startup the Trusted Platform Module (TPM) and perform a hash-extend of BIOS. More information on TPMs may be found at URL www-trustedcomputinggroup-org.

The processor 221, chipset 223 and board 225 may be initialized in the pre-EFI initialization (PEI) stage 220. A PEI dispatcher 227 may be executed in the PEI phase 220. After PEI, the driver execution environment (DXE) dispatcher 231 is launched securely in the driver execution environment (DXE) 230. The operations at the PEI phase 220 may be run from cache as RAM (CAR) before exiting to the DXE phase 230. The OS boots at the transient system load (TDL) stage 250.

The boot device select (BDS) phase 240 is responsible for choosing the appropriate operating system. Upon a system failure during OS runtime (RT phase 260), such as what is referred to as BSOD (Blue Screen Of Death) in Windows® or Panic in Unix/Linux, the firmware PEI and DXE flows may be reconstituted in an after life (AL phase 270) in order to allow OS-absent recovery activities.

Existing systems may rely on and implement the Clark-Wilson security model to layer security activities. In this model, Layer 0 may encompass the SEC 210 and PEI 220 phases, in a system configured with an EFI architecture. Layer 1 encompasses the DXE phase 230 and Layer 2 encompasses the BDS 240 and TSL 250 phases. In this model, Layer 0 (SEC/PEI) has the highest integrity of security in the platform. Security integrity goes from higher to lower by layer, i.e., Layer 1 has higher security integrity than Layer 2, but less than Layer 0. The highest integrity code is the firmware and performs the key management and key storage. Each successive layer is responsible for checking the integrity of the lower layers. In a secure boot, higher integrity code checks the lower integrity code before passing on control.

The term "Secure Boot" is really a term from the Trusted Computing Group (TCG), which differs from the "Measured" or "Trusted" boot in that if the system is not in a given state (i.e., unauthorized code is discovered), the boot process will omit the unauthorized module or go into some recovery mode. The original Trusted Platform Module (TPM) 1.1b imagined this scenario with the data integrity register (DIR) hardware, and the TPM 1.2 allows for this with its more general non-volatile data (NVData) that is stored in the TPM. The TPM standards document may be found on the public Internet at www*trustedcomputinggroup*org/specs/TPM.

Much of this model beckons from the design outlined in the *IEEE Symposium on Security and Privacy*, 1997, 4-7 May 1997 Page(s):65-71 of the paper entitled "A secure and reliable bootstrap architecture" by Arbaugh, W. A.; Farber, D. J.; Smith, J. M. [Digital Object Identifier 10.1109/SECPRI.1997.601317], hereinafter [Arbaugh]. The [Arbaugh] type of "Secure Boot" was enabled with a customized, non-standard BIOS from Phoenix Technologies LTD. One goal of the secure boot model is to bring the UEFI Secure Boot into a mainstream operating system, such as Microsoft® Vista SP1/Longhorn Server.

The "Secure Boot" differs from the Trusted Boot in that the Root of Trust for Measurement (RTM) is the active agent for Trusted Boot, whereas the "Secure Boot" requires an RTE/RTV (Root of Trust for Enforcement/Validation) in order to effect the policy decision. The RTE/RTV may also leverage the RTM actions and the RTS/RTR (Root of Trust for Storage and Root of Trust for Reporting) of the TPM, as well (i.e., use the TPM to store a white list of image hashes or public keys used to corroborate the image integrity).

The key exchange can be used to pass policy into the firmware. An alternate means of configuring this capability would be a pre-operating system (OS) setup screen with appropriate PoP (Proof-of-Presence).

The use of "Secure Boot" with a white list of public keys for signed images helps solve the "scalability issue" of measured boot, namely the plurality of different hashes. Signing the components results in a level of indirection, namely a (hopefully) smaller set of public keys and root stores, versus an much larger number of possible hashes.

In existing systems, the OS loader is signed, but there is no code in the firmware to check the loader integrity. Subsequent kernel-level code-integrity checks do not have a platform/hardware root of trust. In embodiments of the disclosed invention, a goal is to have UEFI firmware check the loader signature and not invoke if the platform is not in the owner-authorized state. Since UEFI participates in code-integrity guarantees, it becomes even more important to ensure that code-integrity violations do not occur. It will be understood that while disclosed embodiments of the invention work well with a platform conforming to an UEFI architecture, any platform with a separate controller with OOB capabilities may be used to verify keys and ensure the integrity of the boot loader and other key components of the platform.

Figure 4:
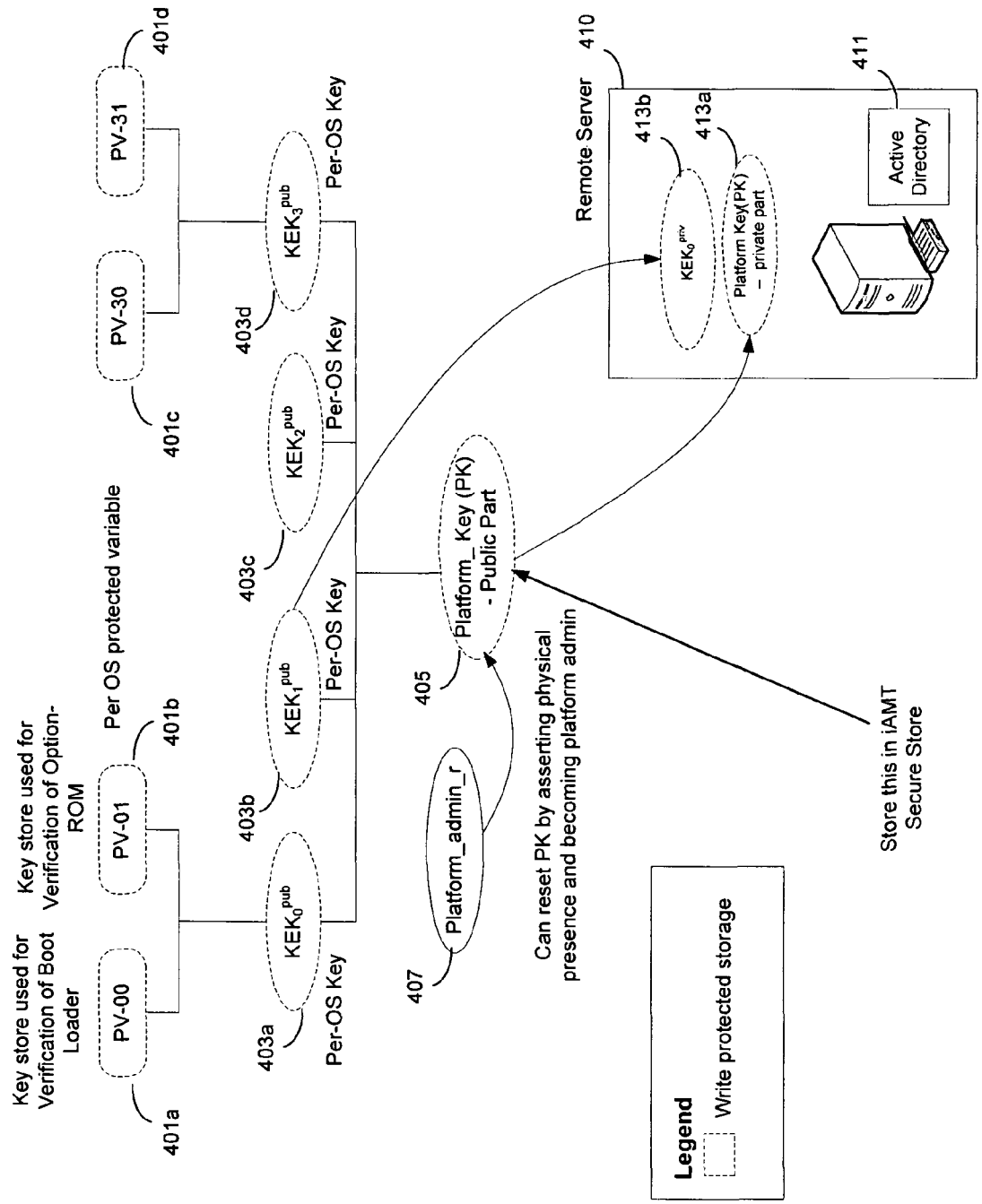
FIG. 4 illustrates a hierarchy of signature keys used to ensure boot and system integrity, according to embodiments of the invention.

FIG. 4 illustrates a hierarchy of keys used to ensure boot and system integrity. Keys outlined with a broken line may reside in write protected storage. In an exemplary UEFI embodiment, PV-00, PV-01, PV-30 and PV-31 (401*a-d*) represent keys to protect UEFI protected variables. These protected variables (PVs) point to the signed UEFI loaders and drivers. $KeK_0^{pub}$, $KeK_1^{pub}$, $KeK_2^{pub}$ and $KeK_3^{pub}$ (403*a-d*) represent the public keys that the firmware stores. Firmware uses the public key 403 to check a digital signature embedded in the UEFI drivers and loaders to see if the signatures are correct. Some keys may not correspond to a protected variable. Each operating system loader typically has its own key. For instance, a platform may have both a Windows® loader and a Linux loader. Both need to be protected. Each loader will have its own public key. Each OS vendor will typically digitally sign their loader products. The platform key (PK) is the key that the Platform OWNER such as a corporate Information Technology (IT) department gives to the platform. The platform uses the PK to encrypt/sign all of the other keys. For instance, the keys, KEKs 403, from OS vendors, or independent hardware vendor (IHV) are encrypted using the PK 405. In other words, the platform firmware uses PK to secure the KEK's.

The Platform_admin_r 407 represents a system, or platform, administrator or IT professional. This administrator will typically turn on the key/signing/encryption feature, and install the PK 405. In an embodiment, the platform administrator 407 may be present at a management console and remotely install and initiate the secure boot feature by sending commands via iAMT networking to the UEFI machine.

The remote server 410 may hold the private keys, such as a platform key 413*a* or OS loader key 413*b*, and certificates and revocation lists in an active directory 411. The active directory 411 is an enterprise registry. The registry may hold information about the managed platforms. A good/valid key list may be stored in the active directory 411. In embodiments of the invention, the ME (or iAMT) accesses the active directory 411 on the remote server 410 to determine whether a key is valid, or has been revoked. In the alternative, the ME may access other remote servers or networks, for instance via the public Internet, to retrieve a list of good or revoked keys.

Figure 5:
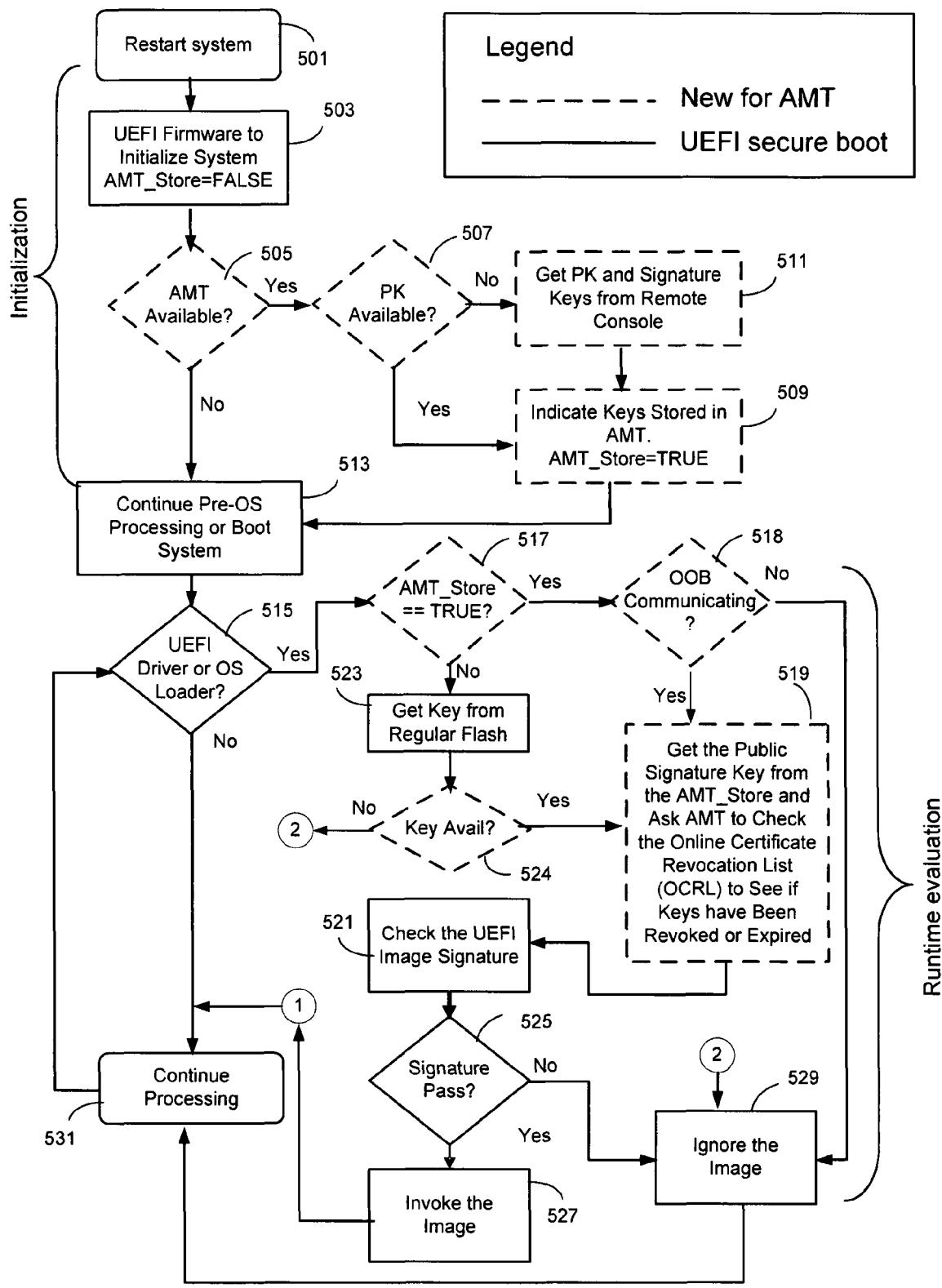
FIG. 5 is a flow diagram of an exemplary method for validating keys and certificates according to an embodiment of the invention.

FIG. 5 is a flow diagram of an exemplary method for validating keys and certificates according to an embodiment of the invention. For illustrative purposes, the system described conforms to unified extensible firmware interface (UEFI) architecture. It will be understood that embodiments of the invention may be implemented on various system architectures having an embedded manageability engine or other out-of-band microprocessor. Processing and decision blocks shown with a broken line indicate procedures to be performed by the iAMT or ME controller, or performed when an iAMT or ME controller is configured to implement an embodiment of the invention is present on the platform. When a system is restarted, or booted up, as in block 501, a UEFI system flag (AMT_Store) may be set to FALSE in block 503. It will be understood by the following description that other methods, including a control line, may be used to determine whether the secure storage contains a key. A flag is used merely for illustration. A determination is made as to whether the ME, (aka iAMT) controller is available, in block 505. If OOB communications are enabled by ME controller, then a determination is made as to whether a platform key (PK) is available on the platform, in block 507. If so, then the keys stored in the ME controller secured storage (on Flash) are indicated, and the system flag AMT_Store may be set to TRUE, in block 509. The flag indicates that keys are available in the ME secured storage area. If the PK was not available, then the PK and signature keys may be retrieved from a remote server, in block 511. The retrieved keys are then stored in the ME secure storage and the AMT_Store flag is set to TRUE. Processing of pre-operating system (OS) or boot system processing continues at block 513.

During boot, it is determined whether a UEFI driver or OS loader is to be launched in block 515. If not, then processing continues with the next boot item, in block 531. The firmware continues to check to see if a driver or loader is to be launched in 515, until boot has completed.

If it is determined that a driver or OS loader is to be launched, then a determination is made as to whether the system flag AMT_Store is TRUE, i.e., keys are available in the secure store, in block 517. If they key is available, then a determination is made as to whether the OOB communication is up and running, in block 518. If no communication is available, for instance, a due to a modem or subsystem failure, then the image is not loaded (529) and processing continues (531). If this image was necessary for the system to boot, a boot failure may occur, requiring recovery. Otherwise, if the OOB communications is working properly, then the public signature key is retrieved from the secure store and the ME controller is requested to validate the retrieved key, in block 519. The OOB component of the ME controller accesses a remote server, bulletin board, Internet location, or the like, to check the Online Certificate Revocation List (OCRL), or other database, to determine whether the key has been revoked or expired.

The UEFI image signature for the drive or OS loaded is checked to see if it has been revoked or expired, based on the determination made by the OOB component, in block 521. If the signature passes, or is still good, as determined in block 525, the image is invoked, launched or loaded, as is appropriate, in block 527, and processing continues at 531 until the boot process is complete.

If no key is stored in the secure storage for the driver or loader in question, as was determined in block 517, then the firmware retrieves a vendor or OEM supplied key from the regular flash storage that is accessible to the BIOS, in block 523. If no key exists in flash memory, as determined in block 524, then the image is not loaded (529) and processing continues (531). If the key exists, it is checked for validity in block 521, and validation of the key continues at block 525. If the signature validation fails, as determined at block 525, then the image is ignored, and will not load, launch or be invoked (529). Processing continues for the next image (driver or loader) at block 531.

If a necessary component, or image, of the system fails to load in 529, the system may fail to boot up to an operating system. It will be understood that various recovery and diagnosis methods may be used to fix the problem. It will also be understood that various platform policies may be invoked that allow a boot when a key is either missing or communication to a remote server is unavailable. In this case, a message may be sent or queued to the system administrator to notify the administrator that corrective action needs to be performed a later time. Various permutations of ignoring a load image or allowing some types of images to be loaded, based on the severity of the key failure.

The techniques described herein are not limited to any particular hardware or software configuration; they may find applicability in any computing, consumer electronics, or processing environment. The techniques may be implemented in hardware, software, or a combination of the two.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Each program may be implemented in a high level procedural or object-oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine accessible medium having stored thereon instructions that may be used to program a processing system or other electronic device to perform the methods.

Program code, or instructions, may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers), and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks or portions thereof may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A system for secure boot on a platform, comprising:
a host processor coupled with a firmware memory store to store firmware to boot the host processor; and
a second processor on the platform, the second processor communicatively coupled to a secure area of a memory store, the secure area of the memory store being inaccessible to the firmware and other host processor applications, the second processor to retrieve and validate a signature key from the secure area to control image loading during boot the second processor has network access for an out-of-band connection, even when the host processor has not yet booted, and the second processor to validate the key when the host processor is not even booted using the out-of-band connection by accessing an active directory listing valid keys on a remote server to determine if the signature key is valid or revoked.

2. The system as recited in claim 1, wherein the secure area of memory store resides on the firmware memory store.

3. The system as recited in claim 2, wherein the firmware memory store is flash memory partitioned by a chipset on the platform, the partitioning to make the secure memory area inaccessible to the firmware.

4. The system as recited in claim 1, wherein the firmware is configured to retrieve a signature key from the firmware memory store if the signature key is not available in the secure memory area.

5. The system as recited in claim 1, wherein the firmware will not load or launch the software image if the signature key associated with the software image fails validation.

6. The system as recited in claim 5, wherein validation failure is a result of at least one of an expired certificate, missing certificate or a revoked certificate.

7. The system as recited in claim 1, wherein a signature key comprises at least one of a platform key, protected variable key, or a public key.

8. The system as recited in claim 7, including a hierarchy of signature keys where a higher level key protects a lower level key.

9. The system as recited in claim 8, wherein the platform key is a higher level than a protected variable key which is a higher level than a public key, wherein a public key is associated with each software image to be loaded during boot.

10. The system as recited in claim 1, wherein a certificate validation or online certificate revocation list is retrieved from at least one of a local area network, remote network, location on the public Internet, a location on an intranet, or a machine accessible bulletin board.

11. The system as recited in claim 1, wherein the second processor comprises one of an active management technology microcontroller, a manageability engine controller, or a baseboard management controller.

12. The system of claim 1, wherein the second processor has out-of-band communication capabilities and is configured to validate the signature key and to access at least one of a certificate validation or online certificate revocation list from a remote location via out-of-band communication.

* * * * *